United States Patent
Booth et al.

(10) Patent No.: US 9,015,204 B2
(45) Date of Patent: Apr. 21, 2015

(54) ONBOARDING RESOURCES TO AN IDENTITY MANAGEMENT SYSTEM

(75) Inventors: David Booth, Somerville, MA (US); Stuart Williams, Tockington (GB); Jason Rouault, Fort Collins, CO (US); Marek Kisielewicz, Sunnyvale, CA (US); Jishnu Mukerji, Short Hills, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 438 days.

(21) Appl. No.: 12/503,794

(22) Filed: Jul. 15, 2009

(65) Prior Publication Data
US 2011/0016162 A1 Jan. 20, 2011

(51) Int. Cl.
*G06F 7/00* (2006.01)
*G06F 17/30* (2006.01)
*G06F 21/60* (2013.01)

(52) U.S. Cl.
CPC ........ *G06F 17/30911* (2013.01); *G06F 21/604* (2013.01)

(58) Field of Classification Search
None
See application file for complete search history.

(56) References Cited

U.S. PATENT DOCUMENTS

| 7,123,608 | B1 * | 10/2006 | Scott et al. | 370/353 |
|---|---|---|---|---|
| 7,765,298 | B2 * | 7/2010 | Villavicencio | 709/225 |
| 2002/0093857 | A1 * | 7/2002 | Cole | 365/200 |
| 2003/0095524 | A1 * | 5/2003 | Stephens et al. | 370/338 |
| 2003/0145074 | A1 * | 7/2003 | Penick | 709/223 |
| 2004/0010591 | A1 * | 1/2004 | Sinn et al. | 709/225 |
| 2008/0288434 | A1 * | 11/2008 | De | 706/47 |
| 2009/0144802 | A1 * | 6/2009 | Tillery et al. | 726/1 |
| 2009/0254971 | A1 * | 10/2009 | Herz et al. | 726/1 |
| 2009/0300714 | A1 * | 12/2009 | Ahn | 726/1 |
| 2009/0300715 | A1 * | 12/2009 | Ahn | 726/1 |
| 2009/0300716 | A1 * | 12/2009 | Ahn | 726/1 |
| 2010/0185968 | A1 * | 7/2010 | Hsu et al. | 715/771 |

OTHER PUBLICATIONS

T. R. Gruber. Toward principles for the design of ontologies used for knowledge sharing. Presented at the Padua workshop on Formal Ontology, Mar. 1993, later published in International Journal of Human-Computer Studies, vol. 43, Issues 4-5, Nov. 1995, pp. 907-928. Available online.); ( Newell 1982); and (Levesque 1984).*

* cited by examiner

*Primary Examiner* — Loan T Nguyen
(74) *Attorney, Agent, or Firm* — Dicke, Billig & Czaja, PLLC

(57) ABSTRACT

A process of onboarding a resource into an identity management system is disclosed. The identity management system is configured to connect users with resources and manage user identities and security entitlements of the connected resources. The process of onboarding a resource includes marking or tagging resource fields with semantic markers.

20 Claims, 3 Drawing Sheets

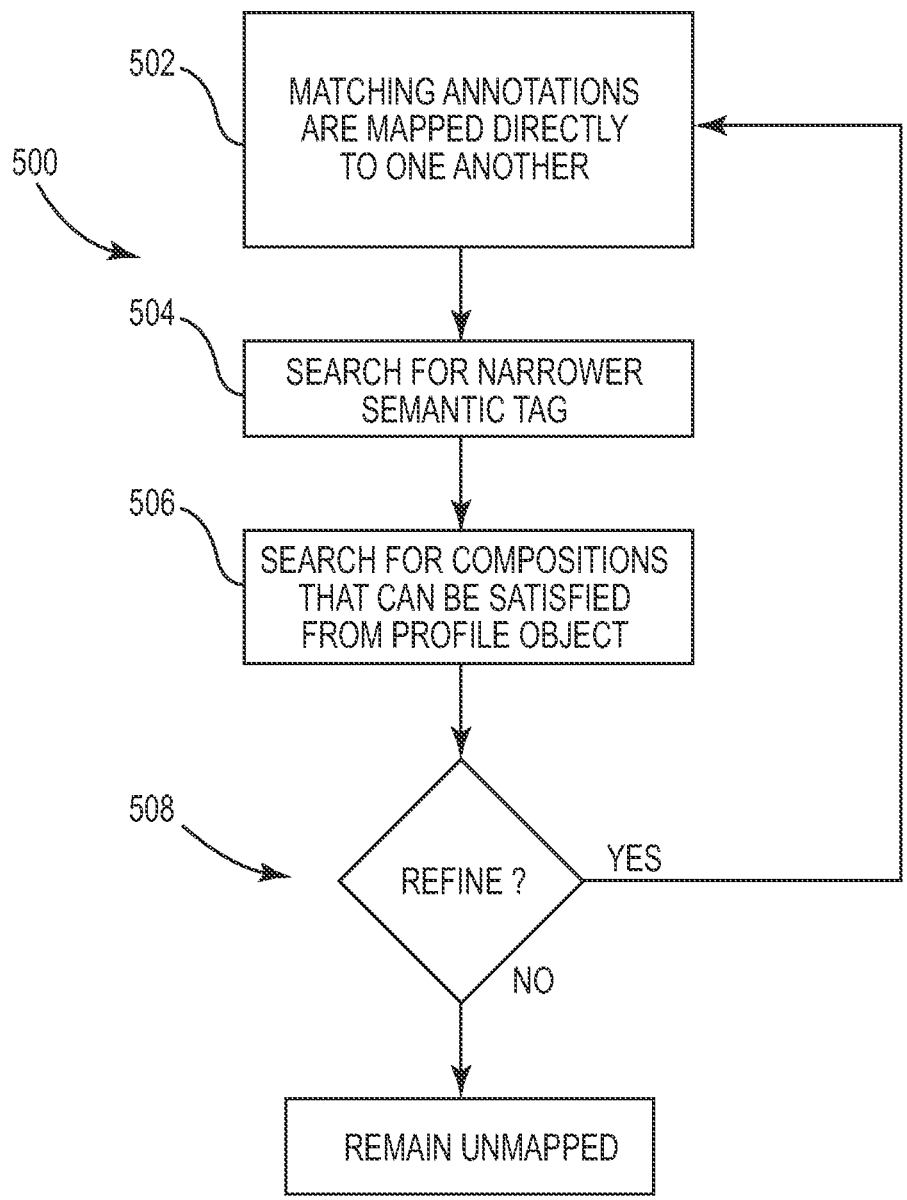

though as adding a new application for users to access. In this instance, the identity management system configures the identities and user entitlements of the resource. However, there is very little standardization of identity profiles required by the resources. Each resource often requires a different identity profile, and the native identity and access attributes used by the resource may need to be mapped to identity and access attributes in the identity management system. Typically, this is a specialized, manual process and is often time consuming.

ONBOARDING RESOURCES TO AN IDENTITY MANAGEMENT SYSTEM

BACKGROUND

Identity management is often regarded as the management of information (as held in a directory) that represents items identified in real life (e.g. users, organizations, devices, services, etc). The management of identities is often associated with the management of user credentials and the processes and means by which users might log on to an online system and connect to selected system resources. Identity management systems or subsystems are used in information systems to support the management of identities. For example, a general purpose identity management system may be used to manage user identities and their respective security entitlements in an identity profile to selectively control access to a heterogeneous set of resources such as applications. One aspect of using an identity management system includes "onboarding" a new resource, such as adding a new application for users to access. In this instance, the identity management system configures the identities and user entitlements of the resource. However, there is very little standardization of identity profiles required by the resources. Each resource often requires a different identity profile, and the native identity and access attributes used by the resource may need to be mapped to identity and access attributes in the identity management system. Typically, this is a specialized, manual process and is often time consuming.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 5 is a flow diagram illustrating a step of the example process for provisioning in onboarding a resource into an enterprise computing system such as the example of FIG. 2.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that the features of the various exemplary embodiments described herein may be combined with each other, unless specifically noted otherwise.

Figure 1:
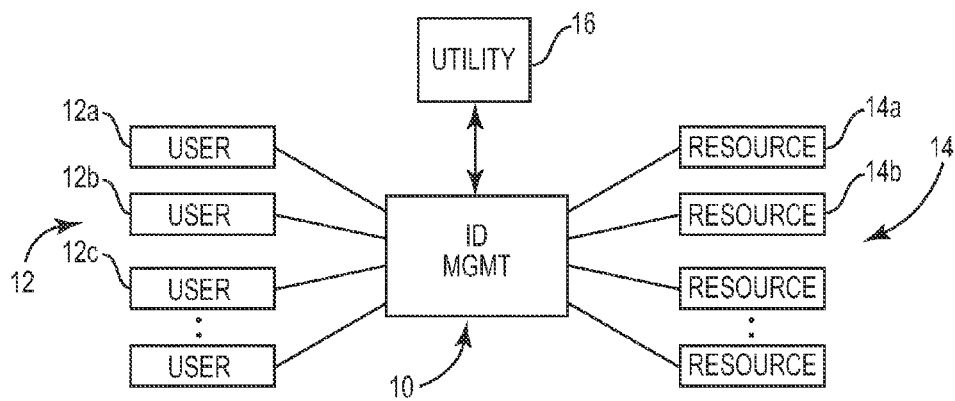
FIG. 1 is a schematic diagram illustrating an environment of an embodiment in the disclosure.

FIG. 1 illustrates an example environment of an embodiment of the disclosure. An identity management system 10 is used to couple a plurality of users 12, to a plurality of resources 14. The identity management system 10 is configured to manage user identities of the users 12 and security entitlements of the connected resources 14. In one example, a first user 12a can have entitlements to full access of sensitive documents stored in a resource 14a; whereas a second user 12b can have no access to the documents in resource 14a. Other combinations are possible, such as third user 12c can have partial access to resource 14b; whereas the first user 12a can have unfettered access to resource 14b. It will be understood that in typical implementations the identity may accommodate thousands of resources or applications.

The identity management system 10 includes a set of identity attributes pertaining to the users 12 that correspond with native identity attributes of the resources 14. The syntax of the existing identity attributes is often different than the required syntax of the native identity attributes of the resource. In order to onboard a new resource, the set of identity attributes pertaining to the users is configured to function with the native identity attributes of the resource. An attribute utility 16 is configured to operate with the identity management system 10 to create or modify the correlation of identity attributes pertaining to the users with the native identity attributes. In one example, the attribute utility 16 can be a software program and deployed in a computer-readable medium having a plurality of computer-executable instructions on the medium for performing the task of correlating the identity attributes. In a more specific example, the attribute utility 16 is a web-based application.

The attribute utility 16 helps create or modify the extensible markup language (XML) and extensible stylesheet language (XSL) mapping files of connectors used with the identity management system 10. In one example, the utility supports bi-directional lightweight directory access protocol (LDAP) and database connectors. The utility provides for loading resource schema directly from the resource and mapping the native identity attributes with the attributes of the identity management system 10. The map can be stored in an XML file accessible to the connectors, and the system can allow for creating new or editing existing mapping files. The utility can also generate an XSL file for reverse synchronization. Still further, the utility can allow for direct provisioning of entitlements in to the resource.

Figure 2:
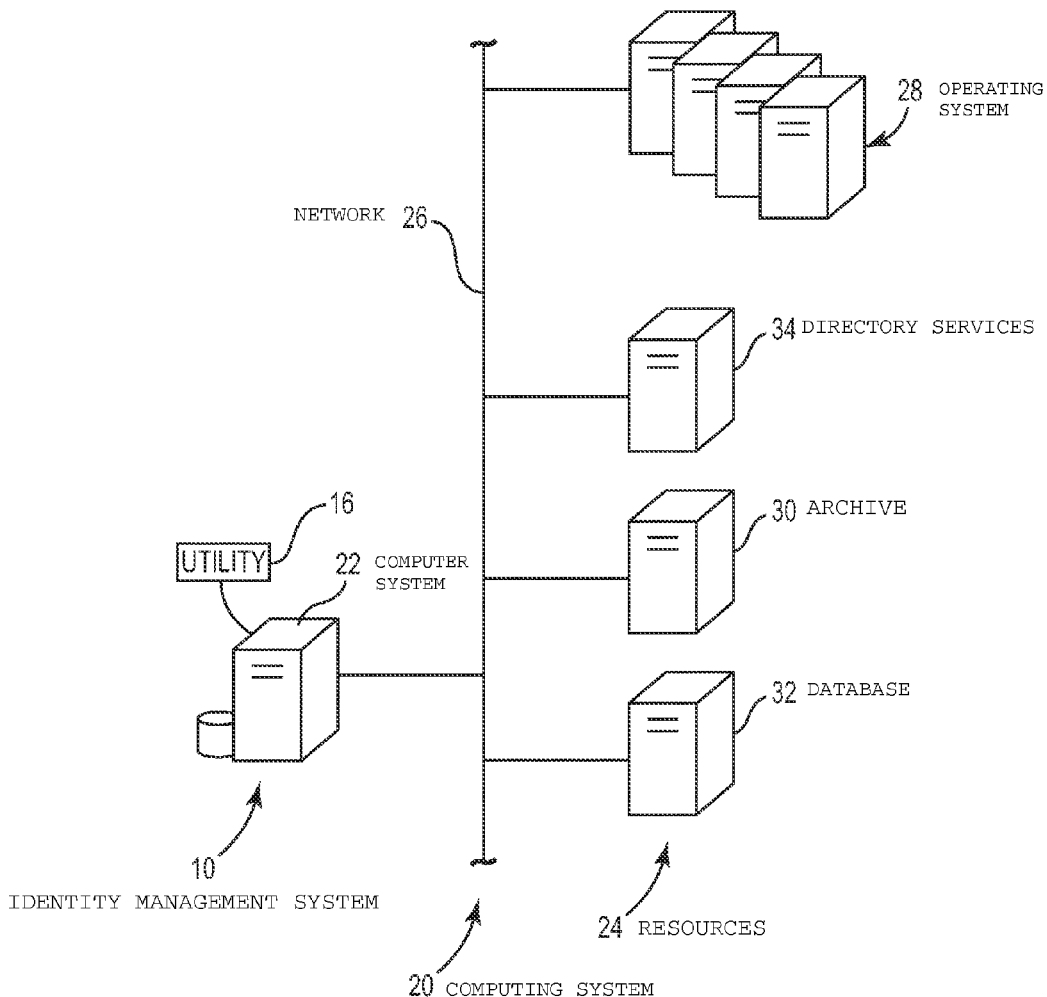
FIG. 2 is a schematic diagram illustrating an example enterprise computing system including an embodiment of an identity management system of the disclosure.

FIG. 2 illustrates an example enterprise computing system 20 including the identity management system 10. The identity management system can be configured to run on a computer system 22 having a processor and a memory, such as a server or a group of servers, and the like. The enterprise computing system 20 also includes resources 24 distributed over a network 26, which can be referred to as the managed environment. In one example, the resources 24 in the managed environment can include an operating system 28 such as a UNIX or UNIX type operating system, an archive directory 30, and/or a database 32 such as a relational database management system. An example of onboarding a resource can include the process of adding a directory service 34 such as an LDAP server into the managed environment 24 through the use of the attribute utility 16.

Figure 3:
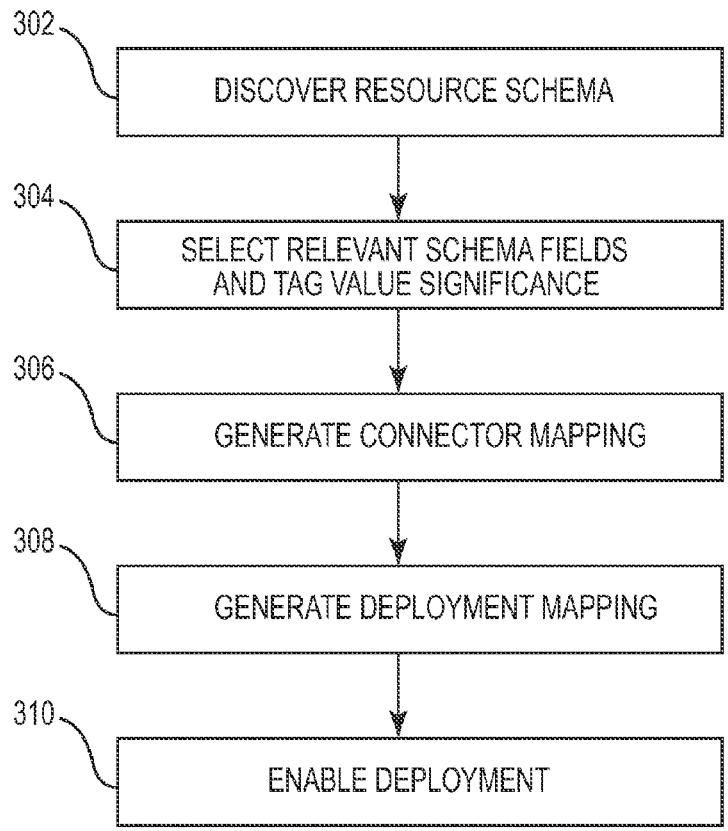
FIG. 3 is a flow diagram illustrating an example process for onboarding a resource into an enterprise computing system such as the example of FIG. 2.

In this example, the attribute utility 16 includes an onboarding tool (not shown), and FIG. 3 illustrates an example process 300 for onboarding a resource, such as the directory service 34 into the enterprise system 20 of FIG. 2. The process can include aspects provided by an application owner and an identity management system administrator. In one example, the application owner may be familiar with the users and entitlements of the application, such as the example resource 34, and the identity management system administrator may be familiar with the identity management system and its deployment model in the enterprise computing system 20. In an embodiment, separate features of the process can be performed with the aid of either the application owner or the identity management system administrator to create efficiencies in onboarding the resources. In some cases, the identity management system administrator and the application owner may be indistinguishable or the same entity. Further, the process 300 is described with reference to an onboarding tool being part of attribute utility 16. It will be understood that many other configurations are contemplated such as the onboarding tool itself being a stand-alone utility. The onboarding tool can be a single article or a collection of articles such as software programs on a media or memory, or the like.

The process shown in FIG. 3 includes discovering the schema of the resource at 302. In the discovery step 302, the onboarding tool connects directly to the resource 34, retrieves the schema used in the resource, and converts the schema to a resource specific ontology. Such schemata can be expressed as resource description framework schemata (RDFS), web ontology language (OWL), or other kinds of ontologies. In one example, the application owner can use the onboarding tool to discover the resource schema.

Relevant schema fields are selected and tagged with value significance at 304. The onboarding tool of the utility 16 can, for instance, present the discovered schema from 302 to a user and enable the user to choose the relevant native schema fields of the resource 34 to be managed with the identity management system 10. The onboarding tool can also be used to enable a user to validate the results of an automapping to an identity concepts catalogue and value significance. As above, the application owner, for instance, can use the onboarding tool to select the relevant schema and tag the value significance in this way.

A connector mapping is generated at 306. The onboarding tool can be used to generate, or can automatically generate, a connector mapping file, to enable a user to view and validate the connector mapping file, and save the connector mapping file. For example, the connector mapping file can be saved in the memory of the identity management system 10 for ready access. The application owner, for instance, can use the onboarding tool to generate the connector map in this way.

A deployment mapping is generated at 308. The onboarding tool can generate, or can automatically generate, a deployment mapping file for the new resource 34. The onboarding tool can be used to enable a user to view, validate, and refine as desired the deployment mapping. The onboarding tool can be used to enable a user to configure deployment-specific items such as synch-in and synch-out, as known, and can save the deployment mapping file. For example, the deployment mapping file can be saved in the memory of the identity management system 10 for ready access. The identity management system administrator, for instance, can use the onboarding tool to generate the deployment map in this way.

The deployment is enabled at 310. The onboarding tool can be used to enable the user to add the resource 34 to the relevant identity management service of the identity management system 10. The resource establishes a connection with the identity management system 10, and can be used to begin provisioning and reconciliation. In addition, the onboarding tool can be used to add or modify entries into an identity concepts catalogue as selected by the application owner and the identity management system administrator. The process of onboarding a resource in FIG. 3 thus includes marking or tagging resource fields with semantic significance of the conveyed values, i.e. value significance tagging. The semantic markers or tags may be taken from a catalogue or ontology that is organized to expose broader and narrower significance and syntactic composition relations between catalogue concepts.

The catalogue can be composed of multiple sub-catalogues, which can include contributions from different entities, such as sub-catalogues of corporate, industry, or other community concepts.

In the present embodiments, each catalogue is expressed in a thesauri-like relation between definitions of concepts and concept relations, or relation expression as in an ontology. In one example of this, the catalogues are expressed in a resource description framework (RDF) vocabulary that makes use of the simple knowledge organization scheme (SKOS). The Simple Knowledge Organization System (SKOS) is a standard common data model for sharing and linking knowledge organization systems via the Semantic Web that has been developed by the World Wide Web Consortium (W3C). Additional properties can be defined for expressing syntactic compositions of concept values from the syntactic expression of sub-ordinate concept values. For example, using a narrowPartitive relation in SKOS. RDF ontologies use Uniform Resource Identifiers (URIs) to name concepts, relation and individuals. The global scope of URIs provides for consistent semantics across resources, such as a common set of identity concepts across applications. Using RDF ontologies for relation expressions is a convenient way to express relationships between concepts, and can facilitate automatic inferencing such as inferring the closure of a SKOS narrowerThan or broaderThan relations.

Semantic tagging of native, provisioning, and profile objects, in other words marking the objects according to their meaning, is implemented in this example by annotations on relations, such as the RDF expressions of the corresponding object schema. The annotations can be saved or organized separately from the schema. In situations where the native schema of different resources (such as a collection of corporate LDAP servers, UNIX servers, or WINDOWS clients) make consistent reuse of native object fields, separately stored semantic annotations can be reused to annotate a new resource. In this way, the annotations provide reusable knowledge within a managed community of the meaning attributed by the community to the value or values conveyed in particular object fields. The central profile schema and their annotations also can provide a growing body of knowledge of the local configuration that can contribute to the generation of mappings between resource and identity of management profile object fields.

Figure 4:
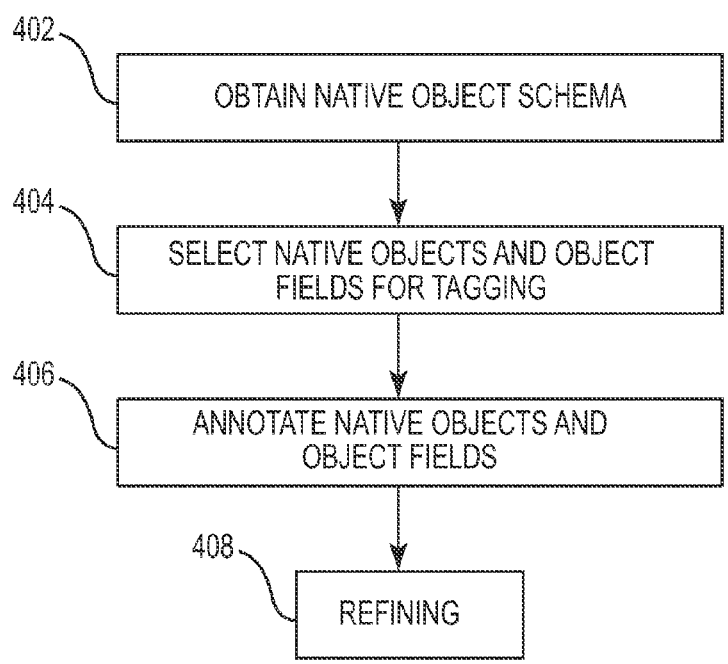
FIG. 4 is a flow diagram illustrating a step of the example process for onboarding a resource into an enterprise computing system such as the example of FIG. 2.

FIG. 4 illustrates examples of steps 302 and 304 of FIG. 3 in more detail, i.e. an example preparation process for mapping 400. The native object schema of the resource are generated or introspected at 402. The native objects and object fields are selected for provisioning at 404. The projected native objects and object fields are annotated by tagging at 406. The annotations in derived provision objects are refined at 408. In this example, generic annotations can be refined to be more specific such as taking "telephone number" to "office telephone," "landline telephone," or the like. In one example, this process is automatic and can be implemented in the onboarding tool as a computer application or web-based application.

FIG. 5 illustrates an example process for field mapping 500, i.e. step 306 of FIG. 3. Provisioning object fields and profile object fields with matching annotations are mapped directly to one another at 502.

Of the remaining unmapped provisioning object fields, a search is made of the catalogue and profile object for profile fields annotated with a narrower semantic tag than the field for which a mapping is sought at 504. In one possible search algorithm, the search progresses through the catalogue in a breadth first manner starting with the concept of the tagged provisioning object field and stopping at the first level where the profile field is tagged with a concept that is narrowerThan or broaderThan the provisioning object field. In the case of multiple matches, the issue can be presented to the user (owner, administrator, or the like) via a suitable user interface of the tool to resolve the discrepancy.

Of the remaining unmapped provisioning object fields, the catalogue is searched for compositions that can be satisfied from the profile object at 506. An example provides for a breadth first search of the catalogue—where again the use of other algorithms is contemplated—starting from the annotation applied to the provisioning object field being mapped and stopping at the level of the first match. Again, a case of multiple matches can be presented to the user (owner, administrator, or the like) to resolve.

The remaining unmapped provisioning object fields will either remain unmapped such that their annotations be further refined at 508, and 502, 504, 506 can be repeated. This can also entail the catalog being augmented by the user with new concept entries to enable such refinement.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of onboarding in an identity management system, comprising:
    discovering native object fields for identity management, wherein the fields are in an object schema of a resource to be onboarded into the identity management system;
    marking fields in the object schema of the resource with semantic markers corresponding with fields of provisioning objects in the identity management system, wherein the semantic markers are organized in an ontology having a plurality of specificity levels of increasing specificity to provide generic to specific relations of definition between the semantic markers;
    mapping the fields in the object schema of the resource to one or more provisioning objects of an identity management system profile including,
        directly matching the fields of the object schema having the same markers as the fields of the provisioning objects for a selected specificity level of the plurality of specificity levels in the ontology to create matched fields and unmatched fields;
    increasing the specificity level of the selected specificity level to an increased specificity level; and
        directly matching the unmatched fields of the object schema having the same markers as the fields of the provisioning objects for the increased specificity level; and
    enabling deployment from a generated deployment mapping from mapping the fields to add the resource to the identity management system.

2. The method of claim 1 comprising maintaining a catalogue with semantic markers organized to provide syntactic composition relations between catalogue concepts; and wherein the marking of the fields comprises selecting markers from the catalogue.

3. The method of claim 2, wherein the catalogue is expressed as an ontology.

4. The method of claim 3, wherein the ontology is expressed in a resource description framework vocabulary.

5. The method of claim 1 comprising:
    retrieving a native object schema of the resource.

6. The method of claim 1 comprising:
    selecting native objects and object fields of the resource for projection as provisioning objects.

7. The method of claim 6 comprising:
    annotating projected native schema fields by marking with the semantic markers of conveyed values.

8. The method of claim 7 comprising:
    refining annotations to include more specificity than the conveyed values.

9. The method of claim 7, wherein the provisioning objects are mapped to fields in the identity management system profile.

10. The method of claim 4, wherein the mapping includes:
    searching the catalogue for compositions that are satisfied from profile object fields and wherein any unmapped fields are refined.

11. A non-transitory computer-readable storage medium tangibly storing computer-executable instructions for controlling a computing device in an identity management system, the computer-executable instructions comprising:
    instructions for discovering object fields for identity management, wherein the fields are in an object schema of a resource to be onboarded into the identity management system and converting the object schema to a resource specific ontology;
    instructions for selecting fields and tagging value significance with semantic markers corresponding with fields of provisioning objects in the identity management system, wherein the semantic markers are organized in a provisioning ontology having a plurality of specificity levels of increasing specificity to provide generic to specific relations of definition between the semantic markers;
    instructions for generating a connector map and a deployment map between the fields and the provisioning objects based on the value significance, including,
        instruction for directly matching the fields having the same markers as the fields of the provisioning objects for a selected specificity level of the plurality of specificity levels in the provisioning ontology; and
        instructions for increasing the specificity level of the selected specificity level to an increased specificity level;
        instructions directly matching unmatched fields of the object schema having the same markers as the fields of the provisioning objects for the increased specificity level; and instructions for enabling deployment from a generated deployment mapping from mapping the fields to add the resource to the identity management system.

12. The non-transitory computer-readable storage medium of claim 11, wherein the resource specific ontology is expressed as a resource description framework schemata or a web ontology language.

13. The non-transitory computer-readable storage medium of claim 11, wherein the instructions for selecting fields include instructions for viewing the discovered schema and choosing relevant native fields to be managed with the identity management system.

14. The non-transitory computer-readable storage medium of claim 11, where the instructions for generating the connector map and the deployment map include instructions for saving the connector map and the deployment map into a memory of the identity management system.

15. The non-transitory computer-readable storage medium of claim 11, wherein the instructions are implemented as a web-based onboarding tool.

16. An identity management system configured to onboard a resource in an enterprise computing system, comprising:
   a computer system having a processor and a memory wherein the computer system is configured to couple a user to a selected resource of the enterprise and to onboard resources;
   wherein the resource includes resource fields in a resource schema for identity management;
   wherein the memory includes a catalogue having semantic markers organized in an ontology having a plurality of specificity levels of increasing specificity to provide generic to specific relations of definition between the semantic markers;
   wherein the resource fields are marked with semantic markers of conveyed values;
   wherein the resource fields having the same markers as the fields of provisioning objects are directly matched together for a given specificity level of the plurality of specificity levels in the ontology;
   increasing the specificity level of the selected specificity level to an increased specificity level;
   directly matching unmatched fields of the object schema having the same markers as the fields of the provisioning objects for the increased specificity level; and
   wherein deployment is enabled from a generated deployment mapping from the matching to add the resource to the identity management system.

17. The identity management system of claim 16 including:
   an application utility accessible by an owner of the resource and an administrator of the identity management system to include the memory with a map of a correlation between native object fields of the resource and the identity management system.

18. The identity management system of claim 17, wherein the computer system is coupled to the resource and the user through a network, and wherein the application utility is network based.

19. The method of claim 1 wherein enabling deployment includes establishing a connection between the identity management system and the resource and beginning provisioning and reconciliation.

20. The identity management system of claim 16 wherein the resource schema is described as an ontology.

* * * * *